United States Patent [19]

Föller

[11] Patent Number: 4,706,699
[45] Date of Patent: Nov. 17, 1987

[54] STEAM TRAP

[75] Inventor: Werner Föller, Stuhr, Fed. Rep. of Germany

[73] Assignee: Gestra Aktiengesellschaft, Bremen, Fed. Rep. of Germany

[21] Appl. No.: 929,647

[22] Filed: Nov. 12, 1986

[30] Foreign Application Priority Data

Dec. 11, 1985 [DE] Fed. Rep. of Germany ....... 3543674

[51] Int. Cl.$^4$ ............................................. F16T 1/20
[52] U.S. Cl. ................................. 137/192; 137/614.21
[58] Field of Search ........... 137/192, 196, 613, 614.21, 137/399

[56] References Cited

U.S. PATENT DOCUMENTS 2,399,111 4/1946 George ................................. 137/196
3,183,932 5/1965 Karpus .......................... 137/44.21 X
4,014,362 3/1977 O'Neil ................................. 137/196

Primary Examiner—Alan Cohan
Attorney, Agent, or Firm—Collard, Roe & Galgano

[57] ABSTRACT

There is provided a steam trap having a first valve seat and cooperating closure valve, and an associated control device. A second valve seat and cooperating closure valve are disposed downstream of the first valve seat. An actuating element influenced by the inlet pressure is provided for the second closure valve, which, furthermore, is acted upon by an opening biasing force of a certain magnitude.

7 Claims, 4 Drawing Figures

STEAM TRAP

The present invention relates to a steam trap of the type having a valve seat, a closure valve cooperating therewith and a control device for actuating the closure valve.

For steam traps of this type, the preferred control devices are float drives or thermal drives, for example bimetallic elements, expansion capsules containing an expanding medium, or the like.

In plants where high operating pressures are employed, relatively small amounts of condensate accumulate at the condensate discharge points with the prevailing operating pressures. As a rule, such accumulations amount only to a few liters per hour. However, larger quantities must be drained off during start-up of the plant, that is when the plant is still cold and the pressures are therefore low. The higher draining load during start-up and the large difference in pressure acting under operating pressure on the closure valve necessarily led to large control elements for steam traps used in such applications.

Steam traps for draining larger amounts of condensate from plants operated at low pressure are well known. An example of such a steam trap can be found in DE-PS No. 28 48 128, wherein the control device acts on an auxiliary closure valve and the associated main closure valve is actuated by a piston. Because of this design, the control device is a very small element. However, such a design cannot be used where high operating pressures exist since the throttling gaps required for controlling the piston would become so small that they could no longer be controlled in terms of engineering. In addition, such small gaps would be susceptible to trouble due to soiling or contamination.

Furthermore, a float-controlled steam trap is known (see DE-PS No. 32 15 459) wherein the condensate to be drained is passed through a throttling aperture while passing along the float. As soon as the steam trap opens, the passing condensate generates an additional opening force acting on the float. In this way, the control device, that is, the float, can be kept relatively small in relation to the maximum discharge capacity of the steam trap. However, as such additional force is generated only on opening, even this solution requires a large-volume control device if the differential pressures are very great.

In another known thermally controlled steam trap (see DE-PS No. 12 61 126) with high flow-through capacity, the closure valve is largely relieved from pressure, so that the closing or shutting force to be generated by the control device is low, which means that the required constructional volume of the control device is small in relation to the maximum rate of flow-through. The required adapting of the opening and closing curve to the temperature-pressure curve of saturated steam is accomplished through a special design of the control device. Even this steam trap is unsuitable for use under high operating pressure since the high pressure drop occurring within the zone of the valve seat would quickly lead to wear of the valve seat or the closure valve.

The object of the present invention is to provide a wear-resistant steam trap that can be used under high operating pressures and which can also handle the amounts of condensate collected during start-up of the plant, while having a control device with a small constructional volume.

In accordance with the present invention, this object is accomplished by a steam trap having a first valve seat and cooperating closure valve, a control device actuating the first closure valve, a second valve seat and cooperating closure valve, an actuating element for the second closure valve responsive to pressure and influenced in the closing sense by the pressure prevailing at the steam trap inlet, and means for providing a constant biasing force to the second closure valve in the opening sense.

If low pressure prevails at the inlet side of the steam trap, the second closure valve is maintained in the open position by the biasing means provided for this purpose. In this case, the full difference between the pressure prevailing in the steam trap at the inlet side and the pressure at the outlet side acts on the first closure valve, which is actuated by the control device. With respect to capacity, the steam trap is rated in such a way that it is capable under these conditions of discharging the larger amounts of condensate collected in the start-up phase of the plant or installation. Once the inlet pressure has reached a predetermined limit value, the second closure valve is brought to the closed position by the actuating element operating against the opening force of the biasing means, so that an intermediate pressure increasing with the inlet pressure can then form in the space between the first and second shut-off points, that is, between the first closure valve and valve seat and the second closure valve and valve seat. Thus, after the inlet pressure has reached a limit value, the first closure valve is subjected to a pressure differential that is smaller than the difference between the inlet pressure and the outlet pressure of the steam trap. The energy that is to be generated by the control device is limited to this lower pressure differential acting on the first closure valve. Thus, the necessary constructional volume of the control device remains relatively small in spite of the high pressure at the steam trap inlet. At high operating pressure, part of the pressure differential existing between the inlet and outlet pressures is eliminated on the first and second shut-off points. Consequently, the wearing stress or load on the valve seats and closure valves is low as well. Thus, the steam trap according to the present invention is resistant to wear.

With steam traps having thermal control elements and in particular those having bimetallic elements, the opening and closing characteristic is usually adapted to the temperature-pressure curve of saturated steam in the shape of a polygon by special design of the control device. The steam trap according to the present invention has a polygon-shaped characteristic without such special design measures of the control device. At closing pressure of the second closure valve, the break is disposed between the two polygon segments. By adjusting this closing pressure, the break can be shifted and the adapting thus optimized.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
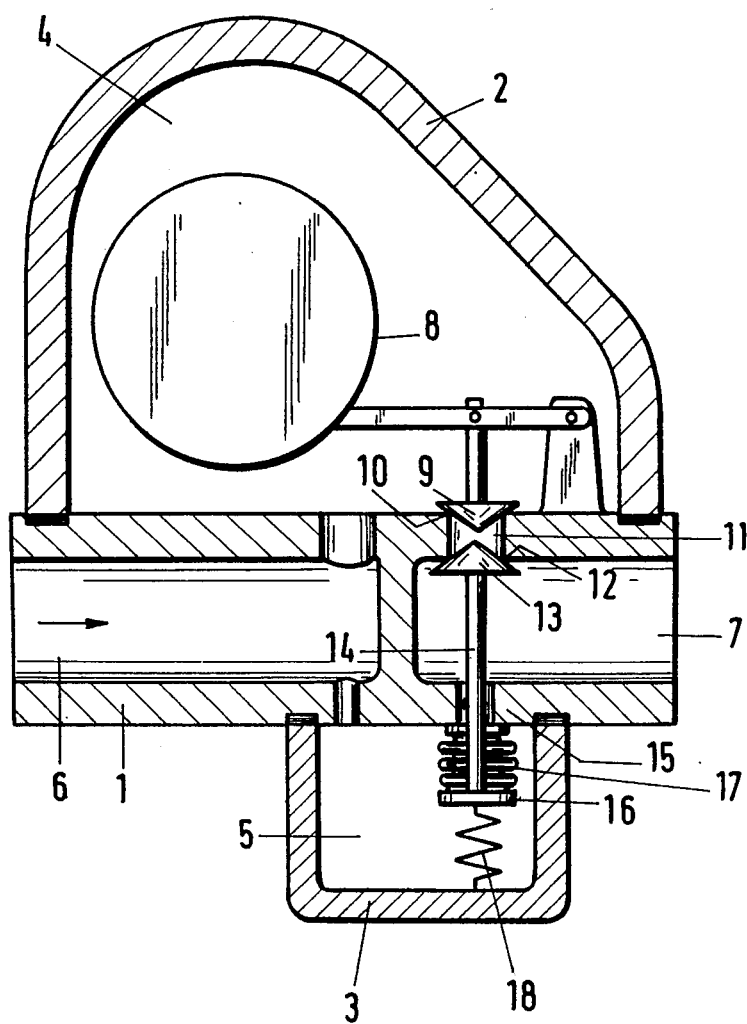
FIG. 1 is a schematic cross-sectional view of a float-controlled steam trap with two closure valves.

Now turning to the drawings, there is shown in FIG. 1 a float-controlled steam trap having a casing comprising a connecting part 1 and two hoods 2 and 3. Connecting part 1 has an inlet duct 6 feeding into interior spaces 4 and 5 of hoods 2 and 3, and an outlet duct 7. A control device 8 fitted with a float for a first closure valve 9 closing in the direction of flow is disposed in interior space 4. This closure valve 9 cooperates with a first valve seat 10 arranged on the in-feed side on a flow-through bore 11 leading from interior space 4 to outlet duct 7. A second valve seat 12 is provided on the out-feed side of flow-through bore 11. A second closure valve 13 cooperates with second valve seat 12 and is arranged in outlet duct 7. Closure valve 13 closes against the direction of flow and is provided with a lifting member or valve stem 14 which extends through a separating wall 15 which separates outlet duct 7 and interior space 5 from one another. In interior space 5, lifting member 14 is provided with a pressure-bearing surface 16. A bellows 17 extends between surface 16 and separating wall 15 and seals the passageway through which lifting member 14 passes. An opening spring 18 acts upon lifting member 14.

The pressure at the inlet side of the steam trap prevails in the two interior spaces 4 and 5. When this pressure is below a predetermined limit value, which is the case, for example during the start-up phase of the plant or installation that is disposed upstream of the steam trap and from which the water is to be drained, opening spring 18 maintains second closure valve 13 in the open position against the shutting or closing force applied to pressure-bearing surface 16 by the inlet pressure. The full difference between the inlet pressure and outlet pressure acts on first closure valve 9. Control device 8 is designed in such a way that it is capable of moving first closure valve 9 into the open position against this pressure differential. Since the pressure differential is still relatively small at this time, the necessary opening force is relatively low and the constructional volume required for control device 8 is thus relatively small as well.

When the pressure at the inlet rises, second closure valve 13 is moved in the closing direction by means of pressure-bearing surface 16 and lifting member 14 against the action of opening spring 18. If no condensate is to be drained, second closure valve 13, on reaching the intended pressure limit value, comes to rest on second valve seat 12, sealing the latter. Consequently an intermediate pressure can build up in flow-through bore 11 which is higher than the pressure at the outlet side in outlet duct 7. In this way, the energy to be generated by control device 8 for opening first closure valve 9 is no longer determined by the difference between the inlet and outlet pressures, but by the lesser difference between the pressure at the inlet and the intermediate pressure in flow-through bore 11.

The gradation 'inlet side pressure'—'intermediate pressure'—'outlet side pressure' is maintained even as condensate is being discharged, because the first and second closure valves 9 and 13, respectively, open in proportion to each other. The pressure of the condensate to be drained is reduced in two stages, at shutoff points 9, 10, and subsequently at shutoff points 12, 13. The wearing load or stress acting on valve seats 10 and 12 and closure valves 9 and 13 is relatively low.

Depending on the relation between the cross sectional area of the second valve seat 12 and the effective size of the pressure-bearing surface 16, the pressure difference acting on first closure valve 9, on closing of the second closure valve 13, will slightly increase, remain constant or even drop if the inlet pressure rises further. Thus the maximum amount of energy to be generated by control device 8 may be limited to this pressure difference. The constructional volume required for control device 8 is consequently significantly smaller than the size that would be required if the latter would have to work against the full difference between the inlet and outlet pressures.

Figure 2:
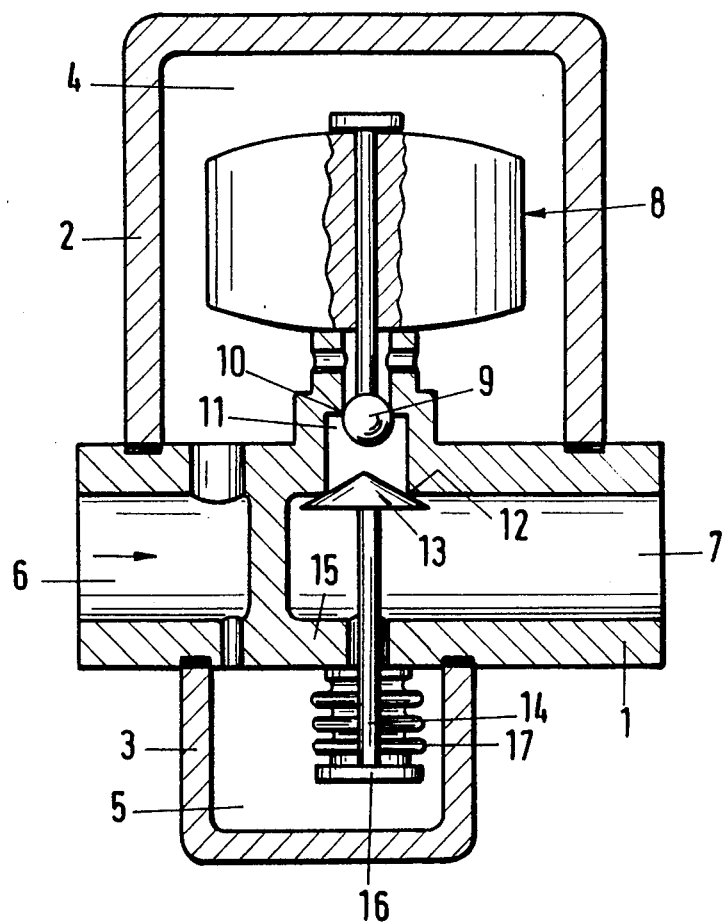
FIG. 2 is a schematic cross-sectional view of a thermally controlled steam trap with two closure valves.

The embodiment according to FIG. 2 is different from the one shown in FIG. 1 in that control device 8, instead of having a float, has a pack of bimetallic elements arranged one on top of the other, of which only the outer contours are shown. The first closure valve 9 opens in the direction of flow. Bellows 17 is selected in such a way that it applies an opening force of sufficient magnitude for second closure valve 13. In this way, a separate opening spring is not required.

The function of the steam trap of FIG. 2 is basically the same as the one described in connection with FIG. 1 with the following special feature added: as long as second closure valve 13 is in the open position, the pressure force acting on first closure valve 9 in the opening sense increases constantly with inlet pressure increase. The closing or shutting force produced by the bimetallic elements of control device 8 increases depending on the temperature. This results in a certain inclination or slope of the opening and closing characteristic of the steam trap. When second closure valve 13 closes, the increase in pressure force acting upon first closure valve 9 in the opening sense is reduced or ceases if the pressure rises further. However, the closing force of control device 8 continues to increase due to the temperature increase that is always associated with a pressure increase at the inlet. This causes a change in the inclination of the opening and closing characteristic, which breaks off in the form of a polygon. In this way, adapting to the temperature-pressure curve of saturated steam is accomplished.

Figure 4:
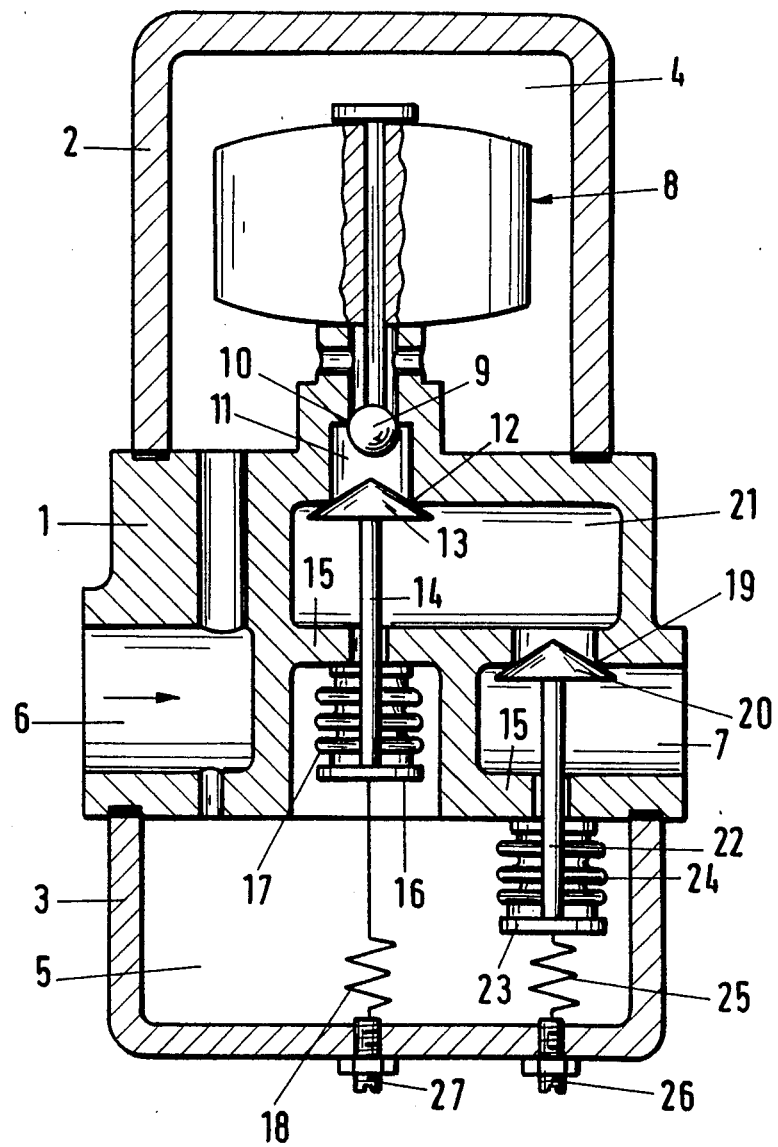
FIG. 4 is a schematic cross-sectional view of a thermally controlled steam trap with three closure valves.

The embodiment according to FIG. 4 is different from the one according to FIG. 2 basically in that a third valve seat 19 with an associated third closure valve 20 is provided downstream of second valve seat 12. A connecting duct 21 with the second closure valve 13 disposed therein extends between second and third valve seats 12 and 19, respectively. A second lifting member or valve stem 22 with a pressure-bearing surface 23 exposed to the inlet pressure, a bellows 24 and an opening spring 25 actuates the third closure valve 20, which closes against the direction of flow. As clearly seen, the two opening springs 18 and 25 of this steam trap can be adjusted by means of screws 26 and 27. This adjustability permits variation of the limit values at which these closure valves close or if provided in the embodiments of FIGS. 1 and 2 it allows variation of the limit value of closure valve 13. This adjustability allows the use of the same steam trap for great variations in pressure ranges.

The two opening springs 18 and 25 are dimensioned and set in a way such that the second and third closure valves 13 and 20 each close at a different limit value of the inlet pressure. The lower limit value determines the maximum pressure difference acting on first closure valve 9 and thus the constructional volume required for control device 8. The opening and closing characteristic of the steam trap breaks for the first time as this limit value is reached (see explanation in this regard relative to FIG. 2). If the higher limit value is exceeded, so that both closure valves 13 and 20 close, additional intermediate pressure builds up in connecting duct 21 and acts on the second closure valve 13 as an additional force. This influences the intermediate pressure in flow-through bore 11 and the characteristic breaks again. This means that the opening and closing characteristic can be adapted to the pressure-temperature curve of saturated steam with particularly good results across a very wide pressure range without requiring any special designs of control device 8.

Figure 3:
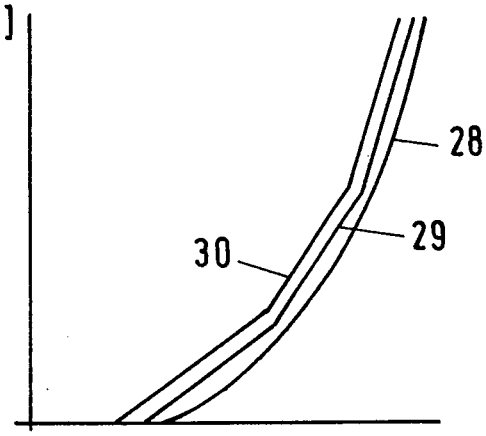
FIG. 3 shows a diagram of the temperature-pressure curve relating to the steam trap according to FIG. 4.

Such adapting is shown by the diagram of FIG. 3, in which the abscissa designates temperature and the ordinate designates pressure. The closing characteristic 29 and opening characteristic 30 of the steam trap according to FIG. 4 are shown ahead of the temperature-pressure curve 28 of saturated steam. This embodiment of a condensate draining device is even more resistant to wear since high pressures are reduced in three stages.

While a few embodiments of the present invention have been shown and described, it will be obvious that many changes and modifications may be made thereunto without departing from the spirit and scope of the invention.

What is claimed is:

1. A steam trap, comprising:
   (a) a first valve seat and a closure valve cooperating therewith;
   (b) a control device responsive to the condensate collected in said steam trap for actuating the closure valve of said first valve seat;
   (c) a second valve seat disposed downstream from said first valve seat and a closure valve cooperating therewith;
   (d) an actuating element for the closure valve of said second valve seat, said actuating element being responsive to pressure and influenced in the closing sense by the inlet pressure prevailing at the steam trap; and
   (e) biasing means providing a constant or predetermined opening bias force to the closure valve of said second valve seat.

2. The steam trap according to claim 1, wherein:
   (a) said actuating element has a surface disposed in a space exposed to the inlet pressure and acted upon by said inlet pressure;
   (b) a separating wall separating said space exposed to the inlet pressure from a space of lower pressure in which the closure valve of said second valve seat is disposed;
   (c) a lifting member extending through said separating wall connecting the surface of said actuating element acted upon by inlet pressure with the closure valve of said second valve seat; and
   (d) a sealing means provided at the point where the lifting member extends through said separating wall.

3. The steam trap according to claim 2, wherein said sealing means comprises a bellows.

4. The steam trap according to claim 3, wherein said bellows forms said biasing means.

5. The steam trap according to claim 1, wherein said biasing means is a spring.

6. The steam trap according to claim 5, wherein said spring is adjustable.

7. The steam trap according to claim 1, further comprising:
   (a) a third valve seat and closure valve cooperating therewith, said third valve seat being arranged downstream of said second valve seat;
   (b) an actuating element for the closure valve of said third valve seat, said actuating element being responsive to pressure and influenced in the closing sense by the inlet pressure prevailing at the steam trap; and
   (c) biasing means applying to the closure valve of said third valve seat an opening bias of a magnitude such that the closing valves of said second and third valve seats close at variation of the inlet pressure.

* * * * *